US012136767B2

(12) United States Patent
Xue et al.

(10) Patent No.: US 12,136,767 B2
(45) Date of Patent: Nov. 5, 2024

(54) ANTENNA ASSEMBLY AND BASE STATION ANTENNA

(71) Applicant: Outdoor Wireless Networks LLC, Claremont, NC (US)

(72) Inventors: Cheng Xue, Suzhou (CN); Bo Wu, Allen, TX (US); Jian Zhang, Suzhou (CN); Bin Sun, Suzhou (CN); Chuande Zheng, Suzhou (CN)

(73) Assignee: Outdoor Wireless Networks LLC, Claremont, NC (US)

( * ) Notice: Subject to any disclaimer, the term of this patent is extended or adjusted under 35 U.S.C. 154(b) by 132 days.

(21) Appl. No.: 18/118,848

(22) Filed: Mar. 8, 2023

(65) Prior Publication Data

US 2023/0291122 A1 Sep. 14, 2023

(30) Foreign Application Priority Data

Mar. 9, 2022 (CN) ........................ 202210221985.5

(51) Int. Cl.

*H01Q 21/24* (2006.01)
*H01Q 1/24* (2006.01)
*H01Q 1/48* (2006.01)
*H01Q 19/10* (2006.01)

(52) U.S. Cl.

CPC ............ *H01Q 21/24* (2013.01); *H01Q 1/246* (2013.01); *H01Q 1/48* (2013.01); *H01Q 19/10* (2013.01)

(58) Field of Classification Search

CPC .......... H01Q 21/24; H01Q 1/246; H01Q 1/48; H01Q 19/10

See application file for complete search history.

*Primary Examiner* — Graham P Smith

(74) *Attorney, Agent, or Firm* — Myers Bigel, P.A.

(57) ABSTRACT

The present disclosure relates to an antenna assembly, which comprises: a feeder panel; an array of radiating elements mounted on the feeder panel; an array of parasitic elements mounted on the feeder panel, in which, at least a portion of the radiating elements in the array of radiating elements are surrounded by a plurality of spaced-apart parasitic elements, respectively, and at least a portion of the parasitic elements in the array of parasitic elements each comprise a first parasitic subcomponent extending in a first direction and a second parasitic subcomponent extending in a second direction perpendicular to the first direction. In addition, the present disclosure also relates to a base station antenna comprising the antenna assembly. This is capable of effectively improving the cross-polarization performance of the base station antenna and improving the radiation boundary of the base station antenna.

20 Claims, 9 Drawing Sheets

200

ANTENNA ASSEMBLY AND BASE STATION ANTENNA

CROSS-REFERENCE TO RELATED APPLICATION

The present application claims the benefit of priority to Chinese Patent Application No. 202210221985.5, filed on Mar. 9, 2022, with the China National Intellectual Property Administration, and the entire contents of the above-identified application are incorporated by reference as if set forth herein.

TECHNICAL FIELD

The present disclosure generally relates to radio communications and more particularly, to an antenna assembly and a base station antenna.

BACKGROUND ART

In some traditional base station antennas, isolation fences may be provided around radiating elements to improve isolation. Isolation fences refer to metal or metallized walls that extend forwardly from a reflector of a base station antenna that are positioned to increase isolation between radiating elements of the base station antenna. The isolation fences may be mounted, for example, either directly on the reflector or on one or more feeder panels that are mounted on the front surface of the reflector. However, mounting these isolation fences to extend forwardly from the reflector may undesirably increase the cost and/or weight of the base station antenna.

In addition, with the development of the communication system, there may be higher requirements for the cross-polarization performance of the base station antenna.

SUMMARY

Therefore, the object of the present disclosure is to provide an antenna assembly and a base station antenna capable of overcoming at least one drawback in the prior art.

According to a first aspect of the present disclosure, an antenna assembly is provided, which comprises: a feeder panel; an array of radiating elements mounted on the feeder panel; an array of parasitic elements mounted on the feeder panel, in which, at least a portion of the radiating elements in the array of radiating elements are surrounded by a plurality of spaced-apart parasitic elements, respectively, and at least a portion of the parasitic elements in the array of parasitic elements each comprise a first parasitic subcomponent extending in a first direction and a second parasitic subcomponent extending in a second direction perpendicular to the first direction.

In some embodiments, the array of parasitic elements is configured to tune the radiation boundary of the array of radiating elements.

In some embodiments, at least a portion of the radiating elements are surrounded by at least four parasitic elements, respectively.

In some embodiments, the four parasitic elements surrounding the radiating element form a rectangular arrangement.

In some embodiments, the first parasitic element and the second parasitic element are spaced apart from each other in a first direction on a first side of the radiating element, and the third parasitic element and the fourth parasitic element are spaced apart from each other in the first direction on a second opposite side of the radiating element.

In some embodiments, at least some of the parasitic elements are electrically connected to the feeder panel.

In some embodiments, the feeder panel is printed with ground pads for the parasitic elements and the corresponding parasitic elements are soldered to the ground pads.

In some embodiments, the ground pads comprise a first soldering portion for the first parasitic subcomponent and a second soldering portion for the second parasitic subcomponent.

In some embodiments, the first soldering portion extends in a first direction, and a second soldering portion extends in a second direction perpendicular to the first direction.

In some embodiments, the ground pads are electrically connected to a ground layer of the feeder panel through a metalized via or conductor.

In some embodiments, the parasitic elements are configured to improve the cross-polarization performance of the radiation pattern of the array of radiating elements.

In some embodiments, the parasitic elements are configured to: improve the peak cross-polarization discrimination rate by at least 2 dB at a horizontal scanning angle greater than a first angle and/or a horizontal scanning angle less than a second angle.

In some embodiments, the first angle is 40° to 55°, and the second angle is 0° to 15°.

In some embodiments, the first angle is 30° to 60°, and the second angle is 0° to 20°.

In some embodiments, a column of parasitic elements are shared between a first column of radiating elements and a second column of radiating elements in the array of radiating elements.

In some embodiments, at least two parasitic elements are shared between every two radiating elements in the first column of radiating elements, and at least two radiating elements are shared between every two radiating elements in the second column of radiating elements.

In some embodiments, the parasitic elements have an axially symmetrical structure.

In some embodiments, the parasitic elements are axially symmetrical with respect to the first direction and/or the second direction.

In some embodiments, the parasitic elements are constructed as T-shaped members.

In some embodiments, the parasitic elements are constructed as cross-shaped members.

In some embodiments, the parasitic elements have an integrated structure.

In some embodiments, the parasitic elements have a split structure, and the first parasitic subcomponent and the second parasitic subcomponent are connected to form the parasitic elements.

In some embodiments, the parasitic elements are metal members.

In some embodiments, the extension length of the first parasitic subcomponent in the first direction is different from the extension length of the second parasitic subcomponent in the second direction.

In some embodiments, the radiating elements are patch radiating elements.

In some embodiments, the extension length of each radiating element in the first direction is greater than the extension length of the first parasitic subcomponent in the first direction, and the extension length of each radiating element in the second direction is greater than the extension length of the second parasitic subcomponent in the second direction.

In some embodiments, the extension length of each radiating element in the first direction is at least two times greater than the extension length of the first parasitic subcomponent in the first direction, and the extension length of each radiating element in the second direction is at least two times greater than the extension length of the second parasitic subcomponent in the second direction.

According to a second aspect of the present disclosure, an antenna assembly is provided, which comprises: a feeder panel; an array of radiating elements mounted on the feeder panel; an array of parasitic elements mounted on the feeder panel for tuning the radiation boundary of the array of radiating elements, in which, at least some of the radiating elements in the array of radiating elements are each surrounded by a plurality of parasitic elements, and the array of parasitic elements is further configured to improve the cross-polarization discrimination rate of the radiation pattern.

According to a third aspect of the present disclosure, an antenna assembly is provided, which comprises: a feeder panel; an array of radiating elements mounted on the feeder panel; a plurality of parasitic elements mounted to extend forwardly from the feeder panel, where respective groups of four spaced apart parasitic elements surround at least some of the radiating elements, where at least some of the parasitic elements have T-shaped or cross-shaped cross-sections.

According to a fourth aspect of the present disclosure, a base station antenna is provided, which comprises a reflector and an antenna assembly mounted in front of the reflector according to one of the embodiments of present disclosure.

Some embodiments of the present disclosure are capable of effectively reducing the weight and/or cost of the base station antenna. Some embodiments of the present disclosure are capable of effectively improving the cross-polarization performance, for example, the cross-polarization discrimination rate, of the base station antenna. Some embodiments of the present disclosure are capable of effectively improving the radiation boundary of the base station antenna.

BRIEF DESCRIPTION OF THE DRAWINGS

The present disclosure will be explained in greater detail by means of specific embodiments with reference to the attached drawings. The schematic drawings are briefly described as follows.

DETAILED DESCRIPTION

Figure 1:
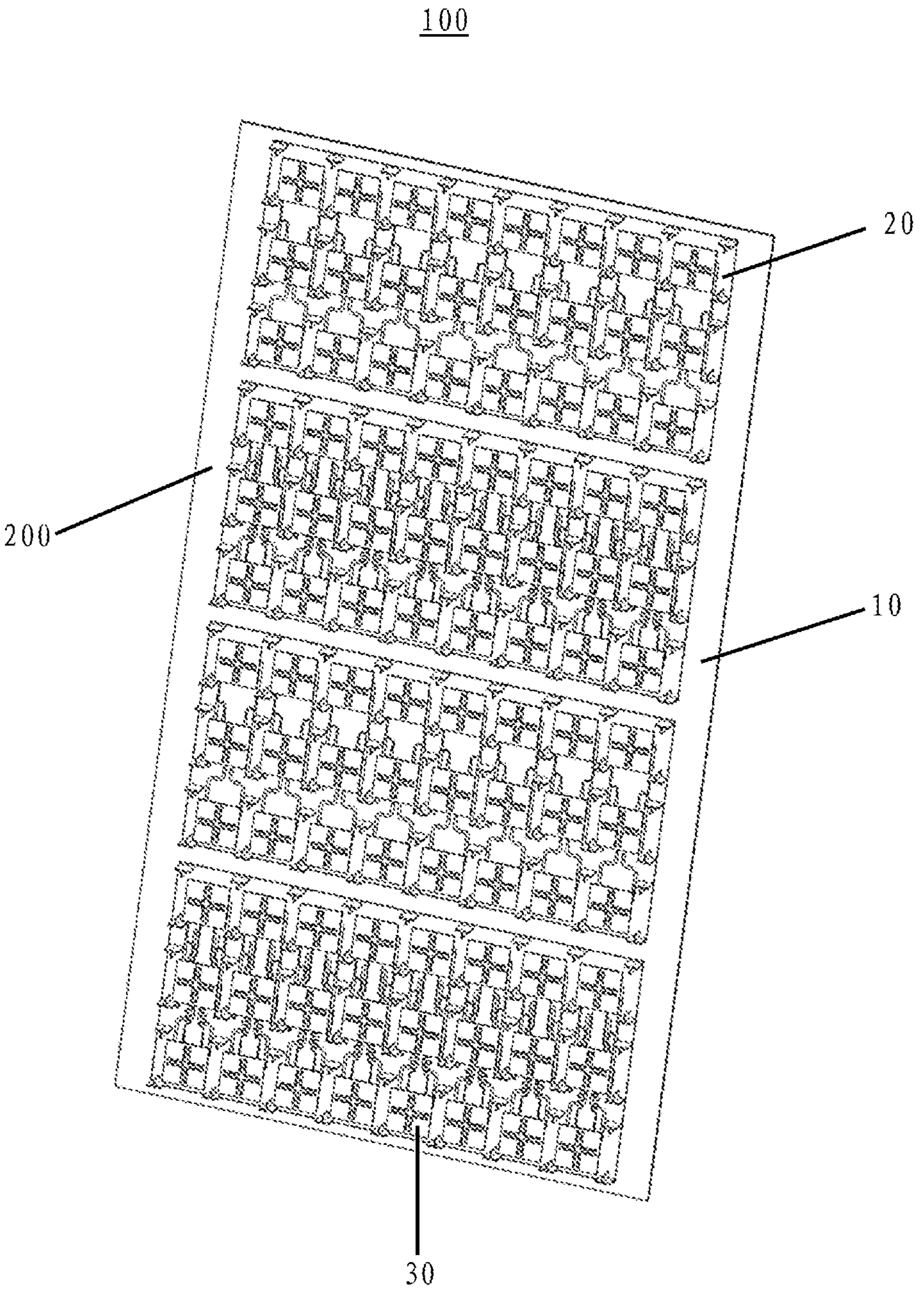
FIG. 1 is a schematic perspective view of a base station antenna according to some embodiments of the present disclosure, in which, the radome is removed.

The present disclosure will be described below with reference to the attached drawings, wherein the attached drawings illustrate certain embodiments of the present disclosure. However, it should be understood that the present disclosure may be presented in many different ways and is not limited to the embodiments described below; in fact, the embodiments described below are intended to make the disclosure of the present disclosure more complete and to fully explain the protection scope of the present disclosure to those of ordinary skill in the art. It should also be understood that the embodiments disclosed in the present disclosure may be combined in various ways so as to provide more additional embodiments.

It should be understood that the terms used herein are only used to describe specific examples, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, when an element is said to be "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present. In contrast, if an element is described as "directly" "on" another element, "directly attached" to another element, "directly connected" to another element, "directly coupled" to another element, or "directly in contact with" another element, there will be no intermediate elements. As used herein, when one feature is arranged "adjacent" to another feature, it may mean that one feature has a part overlapping with the adjacent feature or a part located above or below the adjacent feature.

As used herein, spatial relationship terms such as "upper", "lower", "left", "right", "front", "back", "high", and "low" can explain the relationship between one feature and another in the drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features". The device may also be oriented by other means (rotated by 90 degrees or at other locations), and at this time, a relative spatial relation will be explained accordingly.

As used herein, the term "A or B" comprises "A and B" and "A or B", not exclusively "A" or "B", unless otherwise specified.

As used herein, the term "schematic" or "exemplary" means "serving as an example, instance or explanation", not as a "model" to be accurately copied". Any realization method described exemplarily herein may not be necessarily interpreted as being preferable or advantageous over other realization methods. Furthermore, the present disclosure is not limited by any expressed or implied theory given in the above technical field, background art, summary of the invention or embodiments.

As used herein, the word "basically" means including any minor changes caused by design or manufacturing defects, device or component tolerances, environmental influences, and/or other factors.

As used herein, the term "at least part" may be a part of any proportion. For example, it may be greater than 10%, 20%, 30%, 40%, 50%, 60%, 70%, 80%, 90%, or may even be 100%, i.e. all.

In addition, for reference purposes only, "first", "second" and similar terms may also be used herein, and thus are not intended to be limitative. For example, unless the context clearly indicates, the words "first", "second" and other such numerical words involving structures or elements do not imply a sequence or order.

It should also be understood that when the term "comprise/include" is used herein, it indicates the presence of the specified feature, entirety, step, operation, unit and/or component, but does not exclude the presence or addition of one or a plurality of other features, steps, operations, units and/or components and/or combinations thereof.

In some base station antennas, isolation fences (also referred to herein simply as "fences") may be mounted between various of the radiating elements. These fences may comprise vertically extending fences that extend parallel to a longitudinal axis of the base station antenna and may also comprise horizontally extending fences. On one hand, these fences are capable of improving the isolation between adjacent radiating element columns, and on the other hand, they are capable of adjusting the radiation boundary of the array of radiating elements. However, mounting these fences on the feeder panel or reflector will also undesirably increase the cost and/or weight of the base station antenna. In addition, the mounting of fences also increases the routing difficulty on the feeder panel as the fences usually span a plurality of radiating elements and therefore have a longer extension dimension.

In addition, with the development of the communication system, there may be higher requirements for the cross-polarization performance of the base station antenna such as, for example, cross-polarization isolation. Cross-polarization isolation refers to how well radiating elements of the base station antenna having a first polarization will be isolated from radio frequency ("RF") energy radiated by radiating elements of the base station antenna that have a second (orthogonal) polarization. The cross-polarization performance of the base station antenna may vary depending on the electronic scanning angle of the generated antenna beams (i.e., the angle at which the antenna beam is electronically scanned from a "boresight" pointing direction of the radiating element, which is typically an axis extending through the center of the radiating element that is perpendicular to the reflector on which theradiating element is mounted). It is desirable to provide tuning elements having different shapes and sizes, for example, extension length and/or extension direction, for different horizontal electronic scanning angles, so as to maintain good cross-polarization performance within a wide range of scanning angles.

The present disclosure provides a base station antenna, which may comprise a feeder panel, an array of radiating elements mounted on the feeder panel, and an array of parasitic elements mounted on the feeder panel. At least a portion or all of the radiating elements in the array of radiating elements may be surrounded by the parasitic elements. The parasitic elements may tune the radiation boundary of the array of radiating elements while maintaining relatively good isolation.

In addition, the array of parasitic elements may be configured to improve the cross-polarization performance, for example, the cross-polarization discrimination rate, of the base station antenna. In some embodiments, the array of parasitic elements may be configured to: improve the peak cross-polarization discrimination rate by at least 2 dB or 3 dB at a horizontal scanning angle greater than a first angle and/or a horizontal scanning angle less than a second angle.

Embodiments of the present disclosure will now be described in greater detail with reference to the accompanying drawings.

Figure 2:
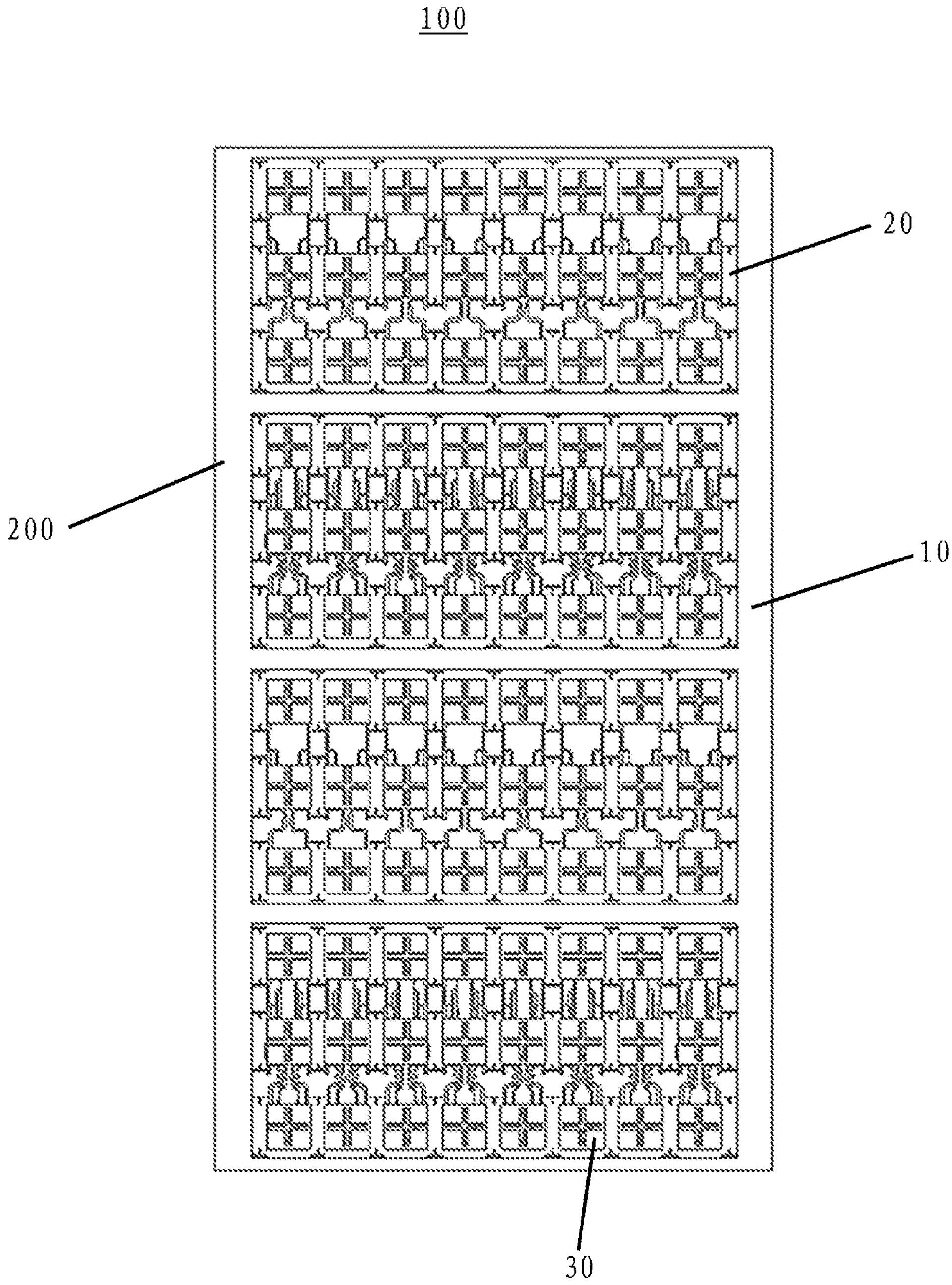
FIG. 2 is a schematic front view of the base station antenna in FIG. 1.

Referring to FIGS. 1 and 2, FIG. 1 is a schematic perspective view of a base station antenna 100 according to some embodiments of the present disclosure, and FIG. 2 is a schematic front view of the base station antenna 100.

The base station antenna 100 may be mounted on an elevated structure, for example, an antenna tower, a telegraph pole, a building, or a water tower, such that the longitudinal axis thereof extends substantially perpendicular to the ground.

The base station antenna 100 is usually mounted in a radome (not shown) that provides environmental protection. The base station antenna 100 may comprise a reflector 10, which may comprise a metal surface that provides a ground plane and reflects electromagnetic waves reaching the reflector 10, for example, so that electromagnetic waves are redirected to propagate forwardly.

The base station antenna 100 may comprise one or more antenna assemblies 200 that are arranged on the front side of the reflector 10. Each antenna assembly 200 may comprise a feeder panel 20 and a radiating element array that includes a plurality of radiating elements 30 mounted on the feeder panel 20. In the illustrated embodiment, the base station antenna 100 may comprise a plurality of (exemplarily 4) antenna assemblies 200, and each antenna assembly 200 may comprise a feeder panel 20 and a patch radiating element array mounted on the feeder panel 20. It should be understood that the patch radiating elements 30 may be radiating elements of various forms, for example, they may be constructed as low-band (617-960 MHz or a sub-band thereof) radiating elements, mid-band (1427-2690 MHz or a sub-band thereof) radiating elements or high-band (3.1-4.2 GHz or a sub-band thereof) radiating elements, etc., and are not limited herein. It will also be appreciated that the patch radiating elements 30 may be replaced with some other type of radiating element such as, for example, cross-dipole radiating elements in other embodiments.

The base station antenna 100 may also comprise mechanical and electronic components (not shown), for example, connectors, cables, phase shifters, remote electrical tilt units, or duplexers, etc. that are usually arranged on the rear side of the reflector 10.

Figure 3:
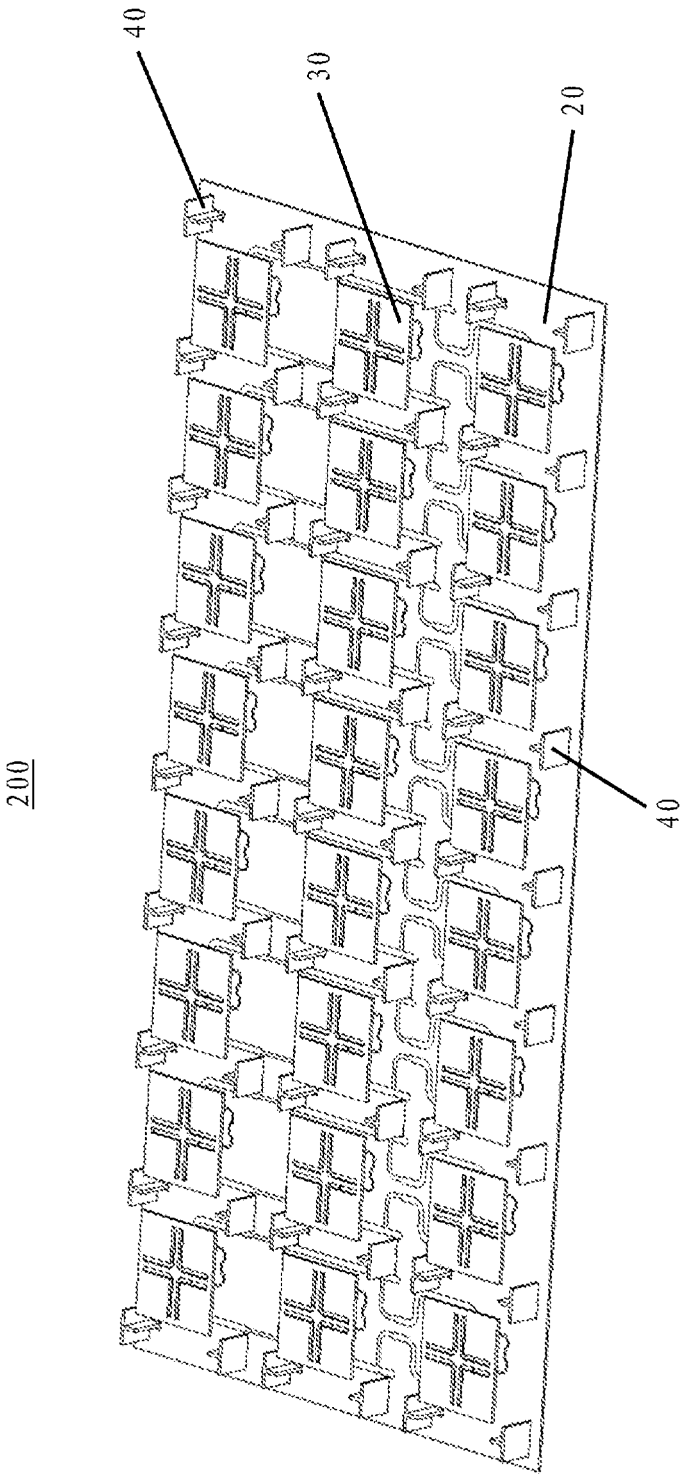
FIG. 3 is a schematic perspective view of an antenna assembly according to some embodiments of the present disclosure.
Figure 4:
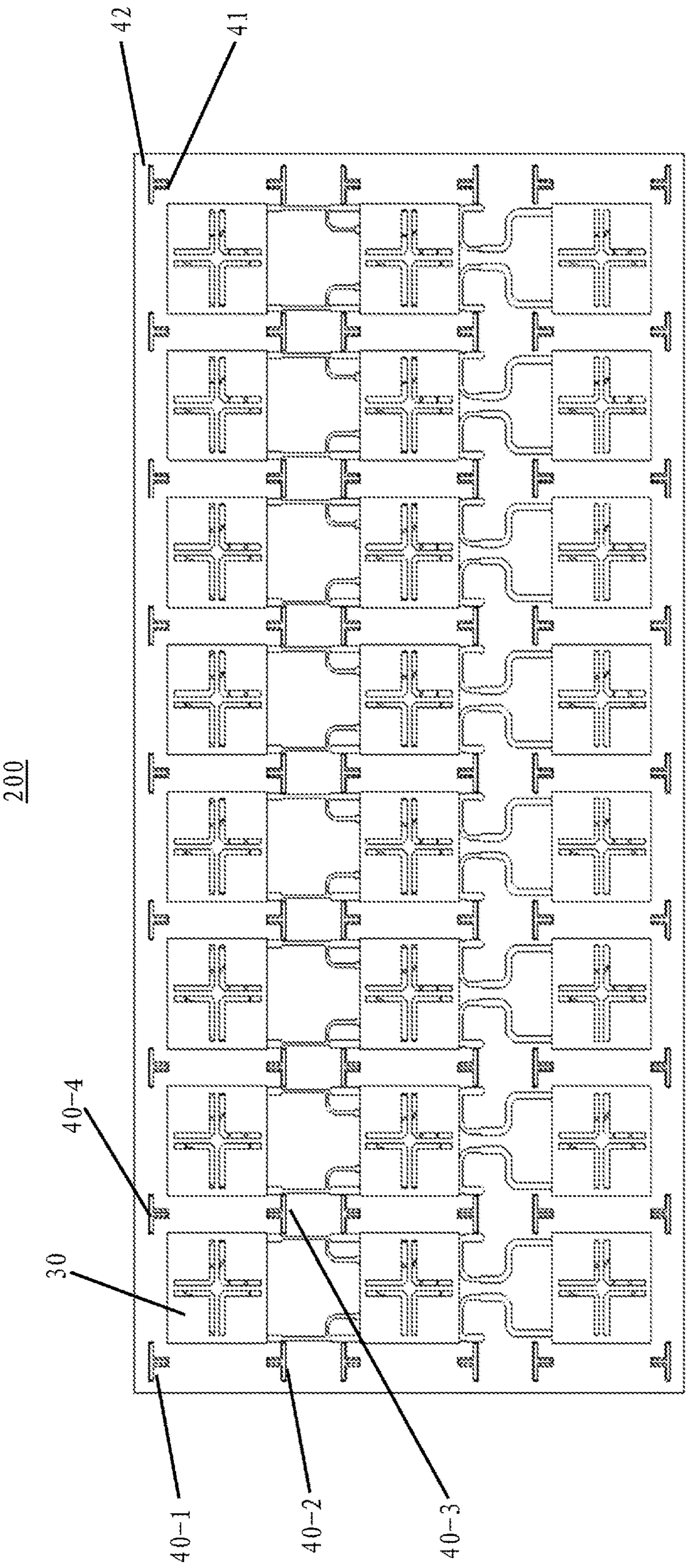
FIG. 4 is a schematic front view of the antenna assembly in FIG. 3.

Next, refer to FIGS. 3 to 6 for a detailed description of the antenna assembly 200 according to some embodiments of the present disclosure. FIG. 3 is a schematic perspective view of the antenna assembly 200 according to some embodiments of the present disclosure; FIG. 4 is a schematic front view of the antenna assembly 200.

As shown in FIGS. 3 and 4, the antenna assembly 200 may comprise a feeder panel 20, an array of radiating elements 30 mounted on the feeder panel 20, and an array of parasitic elements 40 mounted on the feeder panel 20. The feeder panel 20 may comprise, for example, a printed circuit board. In the illustrated embodiment, the array of radiating elements of each antenna assembly 200 may comprise a plurality of rows and a plurality of columns (3 rows and 8 columns in the figure) of radiating elements 30, and a plurality of antenna assemblies 200 may be combined to form the array of radiating elements (12 rows and 8 columns in the figure) of the entire base station antenna 100.

At least a portion or all of the radiating elements 30 in the array of radiating elements may be surrounded by a plurality of parasitic elements 40, respectively. In the illustrated embodiment, each radiating element 30 may be surrounded by four parasitic elements 40. The four parasitic elements 40 may be distributed to be spaced apart from each other around the radiating element 30. The four parasitic elements 40 may form a rectangular (e.g., square) arrangement, with each parasitic element located adjacent a respective corner of the radiating element 30. The first parasitic element 40-1 and the second parasitic element 40-2 may be arranged to be spaced apart from each other in a first direction, that is, a vertical direction, on a first side in the horizontal direction of the radiating element 30, and the third parasitic element 40-3 and the fourth parasitic element 40-4 may be arranged to be spaced apart from each other in the first direction, that is, a vertical direction, on a second side in the horizontal direction of the radiating element 30, where the second side is opposite the first side.

As shown in FIG. 3 and FIG. 4, a column of parasitic elements 40 may be arranged between adjacent radiating element columns in the array of radiating elements 30, and at least one (two here) parasitic elements 40 may be arranged between the adjacent radiating elements 30 in each column of radiating elements 30. In order to maintain good isolation performance between adjacent radiating element 30 arrays, at least a portion or all of the parasitic elements 40 may each comprise, in the first direction, a first parasitic subcomponent 41 that extends in the first direction, that is, a vertical direction, thereby forming a first parasitic subcomponent 41 column arranged in a vertical direction. In order to maintain good isolation performance between adjacent radiating elements 30 of each column of radiating elements 30, at least a portion or all of the parasitic elements 40 may each comprise a second parasitic subcomponent 42 that extends in a second direction, that is, a horizontal direction, thereby forming a second parasitic subcomponent 42 row arranged in the horizontal direction. Therefore, the antenna assembly 200 according to some embodiments of the present disclosure may abandon some, or even all, fences mounted in the traditional design solution to maintain good isolation performance. Advantageously, the parasitic elements 40 may be constructed as an axially symmetrical structure, because the symmetry of the parasitic elements 40 is conducive to the symmetry of the electromagnetic environment. In some embodiments, the parasitic elements 40 may be axially symmetrical with respect to the vertical and/or horizontal direction.

In addition, the dimensions of the parasitic elements 40 of the present disclosure are significantly smaller than that of conventional isolation fences that extend through a plurality of radiating elements. The extension length of the radiating elements 30 in the vertical direction may be significantly longer than the extension length of the first parasitic subcomponent 41 in the vertical direction, for example, by more than 1.5 times, 2 times, or even 3 times. The extension length of the radiating elements 30 in the horizontal direction may be significantly longer than the extension length of the second parasitic subcomponent 42 in the horizontal direction, for example, by more than 1.5 times, 2 times, or even 3 times. Thus, on the one hand, the weight and/or cost of the base station antenna 100 may be reduced, and on the other hand, the routing difficulty of the feed circuit may also be reduced. As shown in FIGS. 3 and 4, the parasitic elements 40 may be mounted in spaces between the feed lines of adjacent radiating element 30 columns such that the feed lines do not have to be additionally detoured to avoid crossing the parasitic elements 40, at least in a partial manner.

The parasitic element 40 array according to some embodiments of the present disclosure may also be configured to improve the cross-polarization performance, for example, the cross-polarization discrimination rate, of the base station antenna 100. The cross-polarization discrimination rate is the ratio of the received main polarization field strength to the cross-polarization field strength in the maximum radiation direction. The horizontal component and vertical component of antenna beams at certain scanning angles may be balanced by adjusting the horizontal components and/or the vertical components of the parasitic elements 40 (for example, the dimension parameters of the first parasitic subcomponent 41 and/or the second parasitic subcomponent 42), thereby improving the cross-polarization performance of the base station antenna 100. In some embodiments, the extension length of the first parasitic subcomponent 41 in the first direction may be different from (for example, greater or smaller than) the extension length of the second parasitic subcomponent 42 in the second direction.

In some embodiments, the parasitic element 40 array may be configured to: improve the peak cross-polarization discrimination rate of antenna beams generated by the base station antenna 100 at a horizontal scanning angle greater than a first angle and/or to improve the peak cross-polarization discrimination rate of antenna beams generated by the base station antenna 100 at a horizontal scanning angle less than a second angle.

In some embodiments, the parasitic element 40 array may be configured to: improve the peak cross-polarization discrimination rate by at least 2 dB or 3 dB at a horizontal scanning angle greater than the first angle (for example, 30° to 60° or 40° to 55°), and/or improve the peak cross-polarization discrimination rate by at least 2 dB or 3 dB at a horizontal scanning angle smaller than the second angle (for example, 0° to 15°).

Figure 5:
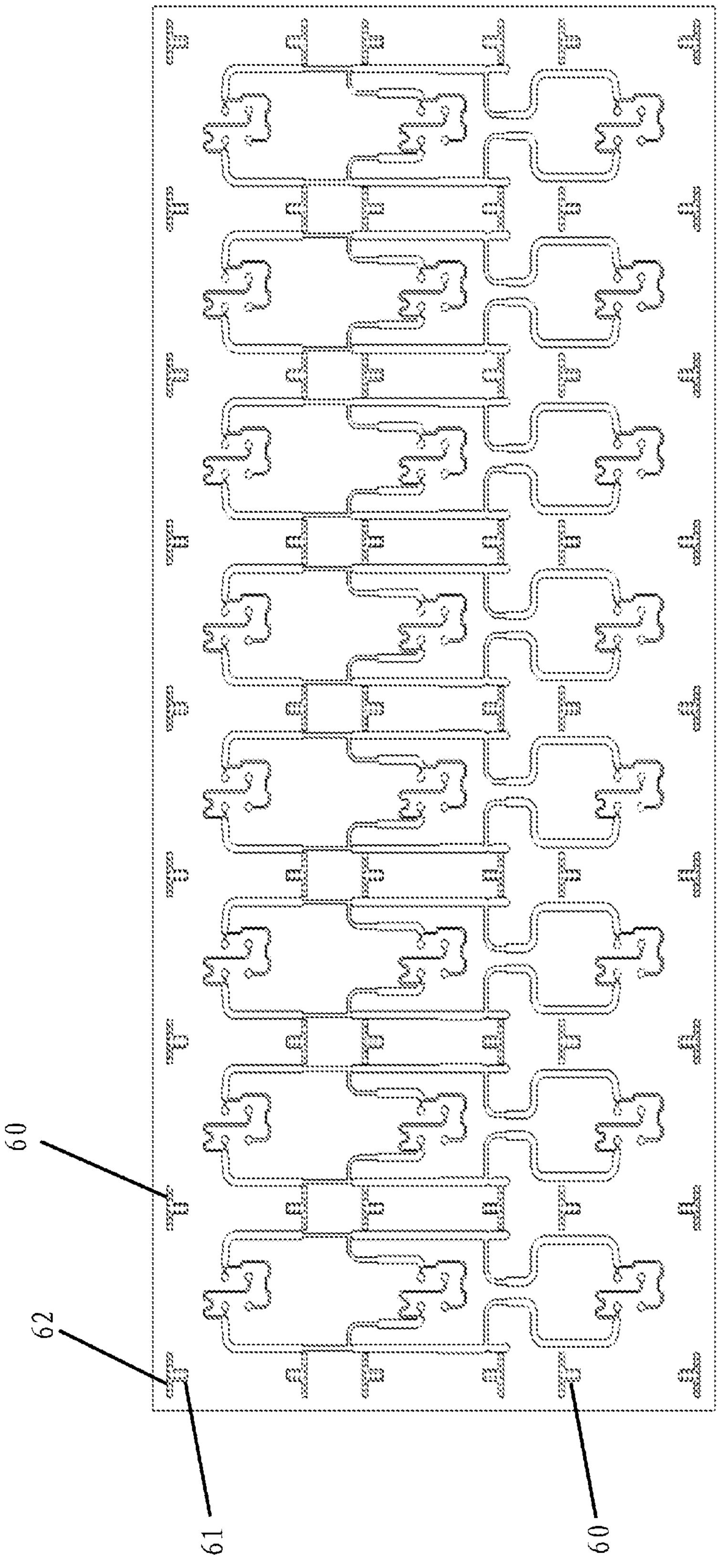
FIG. 5 is a schematic diagram of the metal pattern on a feeder panel of the antenna assembly in FIG. 3.
Figure 6:
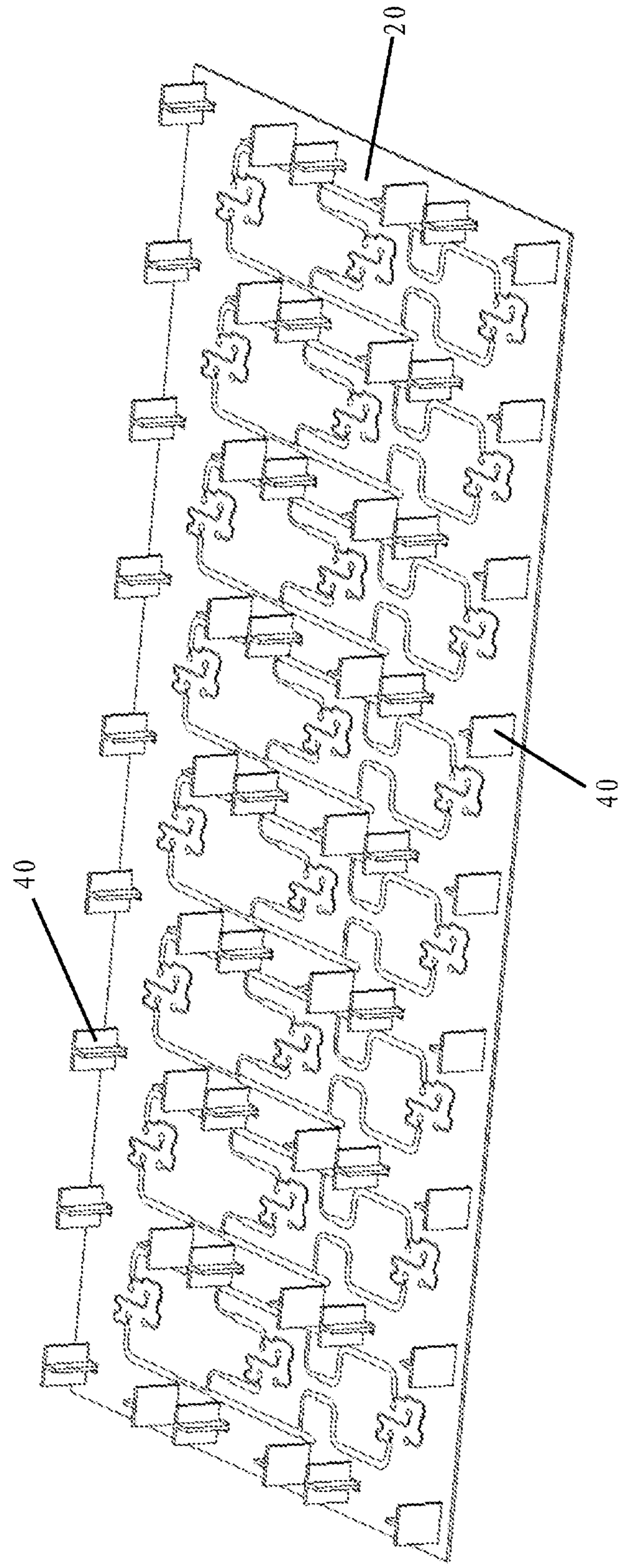
FIG. 6 is a schematic perspective view of the feeder panel mounted with parasitic elements in FIG. 3.

Refer to FIGS. 5 and 6 for a detailed description of the mounting method of the parasitic elements 40 on the feeder panel 20. FIG. 5 is a schematic diagram of the metal pattern on the feeder panel 20 of the antenna assembly 200; FIG. 6 is a schematic perspective view of the feeder panel 20 mounted with the parasitic elements 40.

Base station antennas sometimes include electrically floating tuning elements that may be mounted forwardly of the reflector that are used to fine-tune the shape of the antenna beams generated by the base station antenna. Such electrically floating tuning elements, however, cannot be used to form a radiation boundary for an array of radiating elements of the base station antenna. In contrast, the parasitic element 40 array according to some embodiments of the present disclosure may be electrically connected to the feeder panel 20 (and/or the reflector 10) in order to tune the radiation boundary. The feeder panel 20 may be printed with ground pads 60 for the corresponding parasitic elements 40. The ground pads 60 may be electrically connected to the ground layer on the back of the feeder panel 20 through metalized vias or other conductors.

The ground pads 60 may comprise a first soldering portion 61 for the first parasitic subcomponent 41 and a second soldering portion 62 for the second parasitic subcomponent 42 of the parasitic elements 40. In order to match the shape of the parasitic elements 40, the first soldering portion 61 of the ground pads 60 may extend in a vertical direction, and the second soldering portion 62 may extend in a horizontal direction. In addition, in order to mount the parasitic element 40 array efficiently and reliably, each parasitic element 40 may be soldered onto the corresponding ground pad 60 by means of reflow soldering.

Next, refer to FIGS. 7A-8C for a detailed description of exemplary designs for the parasitic elements 40 according to some embodiments of the present disclosure.

Figure 7A:
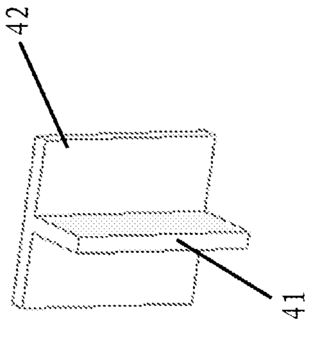
FIGS. 7A, 7B, and 7C are exemplary variants of a parasitic element according to some embodiments of the present disclosure, respectively.
Figure 7B:
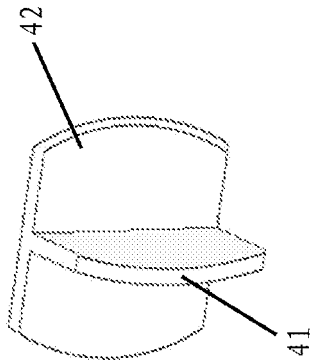
Figure 7C:
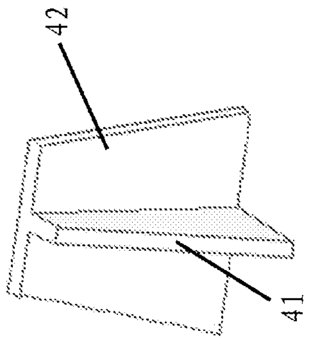

FIGS. 7A to 7C show three exemplary variants of the parasitic element 40, where in each case the parasitic element 40 is implemented as a T-shaped member. The vertical extension of the T-shaped member may be constructed as the first parasitic subcomponent 41 of the parasitic element 40, and the horizontal extension of the T-shaped member may be constructed as the second parasitic subcomponent 42 of the parasitic element 40.

Figure 8A:
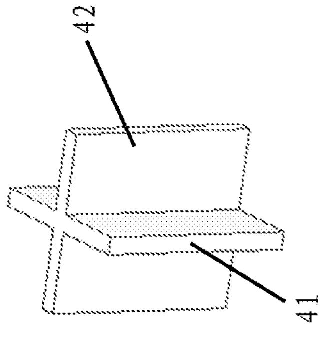
FIGS. 8A, 8B, and 8C are exemplary variants of a parasitic element according to some other embodiments of the present disclosure, respectively.
Figure 8B:
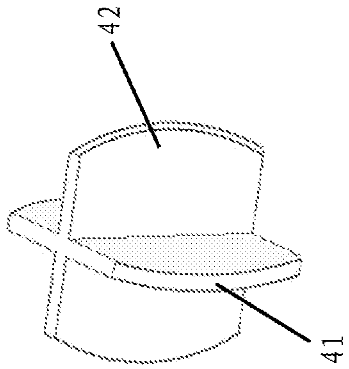
Figure 8C:
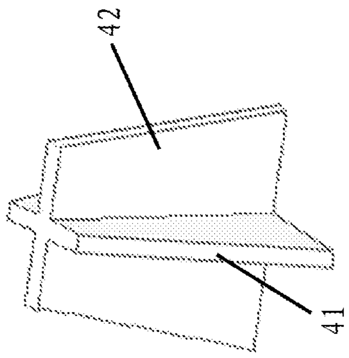
Figure 9:
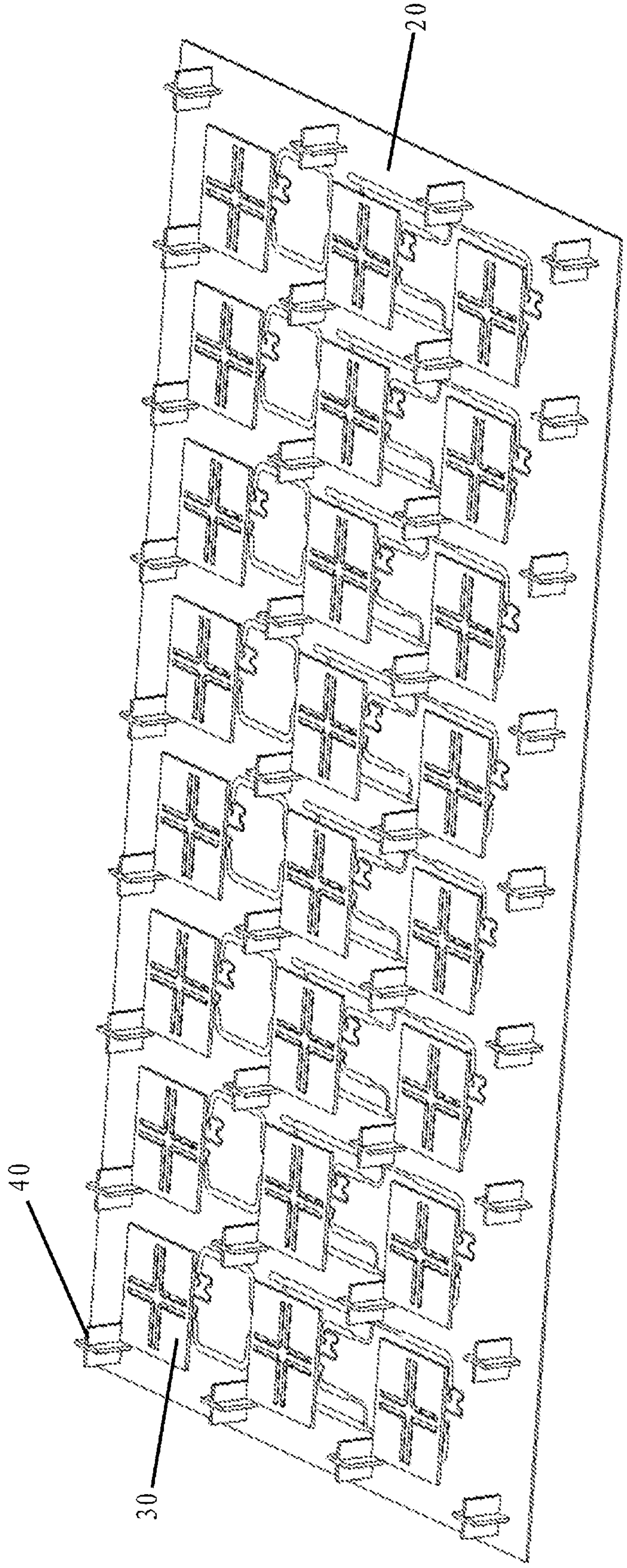
FIG. 9 is a schematic front view of an antenna assembly according to some other embodiments of the present disclosure.
Figure 10:
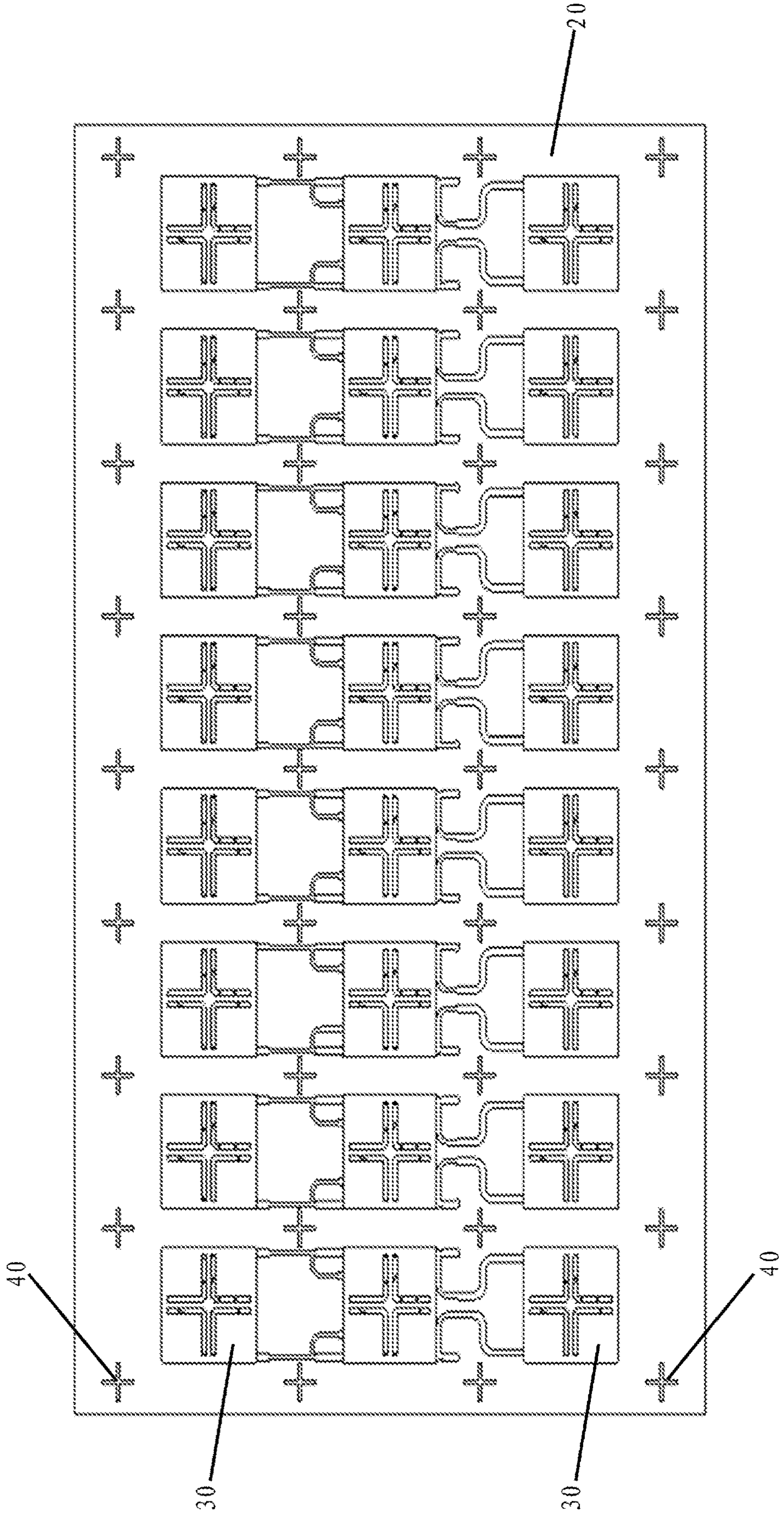
FIG. 10 is a schematic front view of the antenna assembly in FIG. 9.

FIGS. 8A to 8C show three exemplary variants of the parasitic element 40, where in each case the parasitic element 40 is implemented as a cross-shaped member. The vertical extension of the cross-shaped member may be constructed as the first parasitic subcomponent 41 of the parasitic element 40, and the horizontal extension of the cross-shaped member may be constructed as the second parasitic subcomponent 42 of the parasitic element 40. Refer to FIG. 9 and FIG. 10, which are a schematic perspective view and a front view of the antenna assembly 200 when the parasitic elements 40 are cross-shaped members. Similar to when T-shaped members are used as the parasitic elements 40, when the parasitic elements 40 are cross-shaped members, a column of the parasitic elements 40 may be shared between adjacent radiating elements 30 columns. In addition, as the cross-shaped members are symmetrical in the vertical direction and also symmetrical with respect to the horizontal direction, it is possible that: the parasitic elements 40, for example, at least two parasitic elements 40, may also be shared between every two radiating elements 30 in each column of radiating elements 30. The cost and/or weight of the base station antenna 100 may be further reduced and the space utilization rate may be further improved through the sharing of the parasitic elements 40.

In some embodiments, to balance weight and/or cost, only some of the radiating elements 30 in the array of radiating elements 30 may be surrounded by four parasitic elements. In some embodiments, a reduced number of parasitic elements may be provided for a portion of the radiating elements 30, e.g., a portion of the radiating elements 30 are each surrounded by three or two parasitic elements.

In some embodiments, the parasitic elements 40 may have an integrated structure, that is, the first parasitic subcomponent 41 and the second parasitic subcomponent 42 are integrated.

In some embodiments, the parasitic elements 40 may also have a split structure, that is, the first parasitic subcomponent 41 may be mutually connected to the second parasitic subcomponent 42 to form the parasitic element 40. For example, the first parasitic subcomponent 41 may be mutually inserted, soldered, connected through threading or bonded with the second parasitic subcomponent 42 into the parasitic element 40.

In some embodiments, the first parasitic subcomponent 41 and the second parasitic subcomponent 42 of the parasitic elements 40 may be mounted separately on the feeder panel 20 to form independent tuning elements.

In some embodiments, the parasitic elements 40 may be metal members. In some embodiments, the parasitic elements 40 may be printed circuit boards, and corresponding metal patterns may be printed thereon.

Although exemplary embodiments of the present disclosure have been described, those skilled in the art should understand that many variations and modifications are possible in the exemplary embodiments without materially departing from the spirit and scope of the present disclosure. Therefore, all variations and changes are included in the protection scope of the present disclosure defined by the claims. The present disclosure is defined by the attached claims, and equivalents of these claims are also included.

What is claimed is:

1. An antenna assembly, which comprises:

a feeder panel;

an array of radiating elements mounted on the feeder panel;

an array of parasitic elements mounted on the feeder panel, wherein each parasitic element comprises a first parasitic subcomponent that extends in a first direction and a second parasitic subcomponent that extends in a second direction that is perpendicular to the first direction, and wherein each radiating element in the array of radiating elements is surrounded by a respective plurality of spaced-apart parasitic elements from the array of parasitic elements.

2. The antenna assembly according to claim 1, wherein each radiating element is surrounded by at least four parasitic elements.

3. The antenna assembly according to claim 2, wherein the at least four parasitic elements that each radiating element are in a rectangular arrangement.

4. The antenna assembly according to claim 2, wherein the at least four parasitic elements comprises a first parasitic element, a second parasitic element, a third parasitic element, and a fourth parasitic, element, and wherein the first parasitic element and the second parasitic element are spaced apart from each other in a first direction on a first side of the radiating element, and the third parasitic element and the fourth parasitic element are spaced apart from each other in the first direction on a second opposite side of the radiating element.

5. The antenna assembly according to claim 1, wherein at least some of the parasitic elements are electrically connected to the feeder panel.

6. The antenna assembly according to claim 5, wherein the feeder panel is printed with ground pads for the parasitic elements and wherein parasitic elements corresponding thereto are soldered to the ground pads.

7. The antenna assembly according to claim 6, wherein the ground pads comprise a first soldering portion for the first parasitic subcomponent and a second soldering portion for the second parasitic subcomponent.

8. The antenna assembly according to claim 6, wherein the ground pads are electrically connected to a ground layer of the feeder panel through a metalized via or conductor.

9. The antenna assembly according to claim 1, wherein the parasitic elements are configured to improve the cross-polarization performance of the radiation pattern of the array of radiating elements.

10. The antenna assembly according to claim 1, wherein a column of parasitic elements is shared between a first column of radiating elements and a second column of radiating elements of the array of radiating elements.

11. The antenna assembly according to claim 1, wherein the parasitic elements are constructed as T-shaped members.

12. The antenna assembly according to claim 1, wherein the parasitic elements are constructed as cross-shaped members.

13. The antenna assembly according to claim 1, wherein the parasitic elements have an integrated structure.

14. The antenna assembly according to claim 1, wherein the parasitic elements have a split structure, and the first parasitic subcomponent and the second parasitic subcomponent are connected to form the parasitic elements.

15. The antenna assembly according to claim 1, wherein the parasitic elements are metal members.

16. The antenna assembly according to claim 1, wherein the extension length of the first parasitic subcomponent in the first direction is different from the extension length of the second parasitic subcomponent in the second direction.

17. The antenna assembly according to claim 1, wherein the extension length of each radiating element in the first direction is greater than the extension length of the first parasitic subcomponent in the first direction, and the extension length of each radiating element in the second direction is greater than the extension length of the second parasitic subcomponent in the second direction.

18. The antenna assembly according to claim 17, wherein the extension length of each radiating element in the first direction is at least two times greater than the extension length of the first parasitic subcomponent in the first direction, and the extension length of each radiating element in the second direction is at least two times greater than the extension length of the second parasitic subcomponent in the second direction.

19. An antenna assembly, which comprises:

a feeder panel;

an array of radiating elements mounted on the feeder panel;

a plurality of parasitic elements mounted to extend forwardly from the feeder panel, wherein respective groups of four spaced apart parasitic elements surround at least some of the radiating elements, and wherein at least some of the parasitic elements have T-shaped or cross-shaped cross-sections.

20. The antenna assembly according to claim 19, wherein the feeder panel is printed with ground pads for the parasitic elements and wherein parasitic elements that correspond to the ground pads are soldered to the ground pads.

* * * * *